Feb. 2, 1960        R. J. KING ET AL        2,923,364
ADJUSTABLE HITCH USED FOR TOWING IMPLEMENTS
Filed March 29, 1956

INVENTORS:
RICHARD J. KING
BERNARD J. SCHILL
BY: Emerson B Donnell
ATTORNEY

United States Patent Office 2,923,364
Patented Feb. 2, 1960

2,923,364

ADJUSTABLE HITCH USED FOR TOWING IMPLEMENTS

Richard J. King and Bernard J. Schill, Rockford, Ill., assignors to J. I. Case Company, Racine, Wis., a corporation of Wisconsin Application March 29, 1956, Serial No. 574,756

2 Claims. (Cl. 172—678)

This invention relates to agricultural implements, and, more specifically, it relates to the hitch for towing an implement behind a tractor or the like.

A particular application of this invention is found in the agricultural art where a tractor is employed to tow farm implements. Thus, as shown in Fig. 1, a tractor is required to tow a plow, a land packer, and a grain press drill, all of which are conventional implements. Further, it is conventional to draft attach the press drill to the land packer, and in turn draft attach the land packer to the plow, all as shown. However, in the last mentioned attachment, it will be noted that a long hitch or drawbar is employed to extend from the plow drawbar at the front of the plow to the land packer. Because of the length of the hitch, certain forces acting on the hitch, such as axial compression forces, create considerable bending strain on the hitch.

It is, therefore, an object of this invention to provide a hitch wherein the forces acting thereon, in the normal use of the hitch, are not damaging to the hitch.

Another object of this invention is to provide a tow hitch with an adjustable means which is effective in minimizing forces normally encountered in using the hitch, except, of course, the towing force transmitted through the hitch.

Still another object of this invention is to provide a tow hitch with a cushioning means for dampening the effect of the inertia of the towed implement on the towing vehicle when the speed of the latter is reduced.

Other objects and advantages will become apparent upon reading the following description in conjunction with the accompanying drawings, wherein.

Similar reference numerals refer to similar parts throughout the several views.

Figure 1:
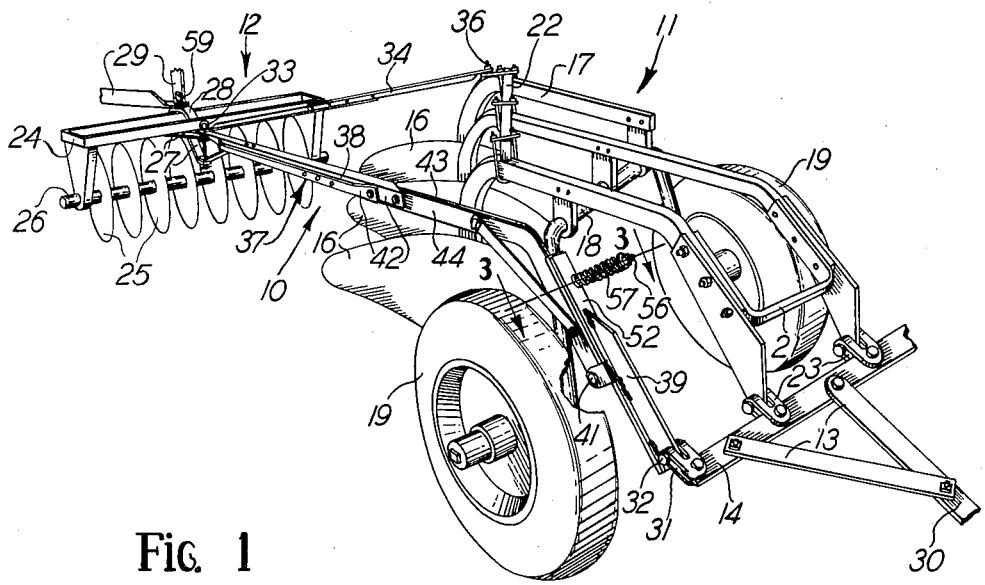
Fig. 1 is a fragmentary front perspective view of a series of implements hitched together with a preferred embodiment of this invention.

The drawings show a preferred and useful application of this invention wherein a drawbar or hitch 10 is shown attached between a leading implement or device 11 and a trailing implement or device 12. It should be understood that a conventional tractor can be employed to provide the towing force required for moving the implements over the ground for their usual functions of working the ground. The tractor can be attached to the implement 11 through drawbars 13, fragmentarily shown, which are suitably attached to a hitch or pull bar 14 on the implement 11 to extend forwardly from the bar 14 to the tractor in the conventional attachment with the latter. The implement 11 is shown to be a conventional plow having three plow bottoms 16 suitably supported on the usual plow beams 17 which are in turn supported on the plow main frame or axle 18. The frame 18 is, of course, supported by the ground engaging wheels 19 shown at opposite sides of the plow, and the beams 17 are preferably secured together by a U-bracket 21 at the front of the plow and a cross bar or beam 22 at the rear of the plow, with the members 21 and 22 being suitably bolted to the beams. Also, the front ends of two of the plow beams 17 are shown to pivotally attach through clevises 23 to the plow pull bar 14. The plow or device 11 is a conventional implement which is attached to the tractor in a conventional manner and is employed in the well-known manner and, therefore, no further description of the plow and the tractor is necessary for a complete description of the invention.

It will also be noted that the device 12 is disposed in a trailing relation with respect to the plow 11 and, in the embodiment shown, the device 12 is a conventional land packer having a frame 24 and a plurality of packer wheels 25 attached to the frame through the horizontally disposed axle 26. Suitable draft bars 27 are attached to the frame 24 to extend forwardly thereof, and a connecting brace or bracket 28 is also attached to the frame as shown. It should also be understood that a grain press drill of the conventional type is normally attached to the device 12 to trail behind the same, and the drawings show the drawbars 29 of the grain press drill or the like suitably attached at their forward ends to the frame 24 of the device 12. With this conventional arrangement of tractor and implements, a plurality of implements, such as a plow, a land packer, and a grain press drill, are draft attached in series to trail behind the tractor with, of course, each of the three implements engaging the ground for the usual and well-known purposes of working the ground in the series of plowing, breaking clods and packing, and finally seeding grain and covering the same by means of the press drill. Since these implements are well-known in construction and in their series arrangement behind a tractor, the drawings only diagrammatically show the implements. The tractor is indicated by a showing of its drawbar 30.

It will be noted that the leading or forward end of the hitch or drawbar 10 is suitably pivotally attached through a clevis 31 and a horizontal pin 32 to the plow pull bar 14. The forward end of the hitch 10, attaching to the clevis 31, is termed a free end of the hitch since, as described later, the other ends of sections of the hitch are hinged together. The rearward and opposite free end of the hitch 10 is pivotally attached to the draft bars 27 of the trailing device 12 through a vertical hitch pin 33. Also, it should be noted that a bar or member 34 and a section 37, comprise the hitch 10, with the section 34 suitably pivotally attached at its forward end to the cross bar 22 on the plow 11, and that the trailing end of the bar 34 is pivotally attached to the device 12 through the pin 33. The bar or member 34 is thus connected to the cross bar 22 by means of a vertically disposed pivot pin 36 supported on the bar 22, and in this manner both ends of the bar or brace 34 are pivotally attached between the leading and trailing implements, so that the brace 34 can move in a substantially horizontal plane by pivoting about the pin 36 if the trailing implement is moved forward with respect to the plow 11.

With this arrangement, it will be noted that the drawbar 10 is relatively long since it extends from the front of the plow 11 to the land packer 12, as sufficient longitudinal spacing between the plow 11 and the packer 12 is required to permit proper operation of both of the implements. When the tractor and the implements are moving in the forward direction, the hitch 10 transmits the towing force between the plow and the land packer as the hitch is subjected to the tensile force of towing. Of course, when the tractor makes a turn, the plow 11 makes a corresponding turn since the plow tracks with respect to the tractor by virtue of the draft attachment through the drawbars 13 and, similarly, the land packer 12 also tracks with respect to the plow by virtue of the lateral spacing of the guide bar 34 and the section 37 on the plow 11. Thus, the hitch 10 attaches to the plow at two laterally spaced apart points, namely the clevis 31 and the pivot pin 36, so that the hitch 10 suitably transmits the towing force to the trailing device 12 in such a manner that the latter must follow in the path of the leading device 11.

Figure 3:
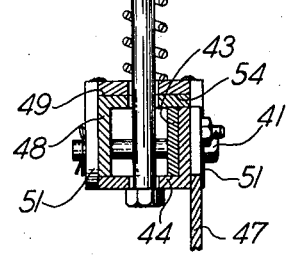
Fig. 3 is an enlarged sectional view taken on the line 3—3 of Fig. 1.
Figure 2:
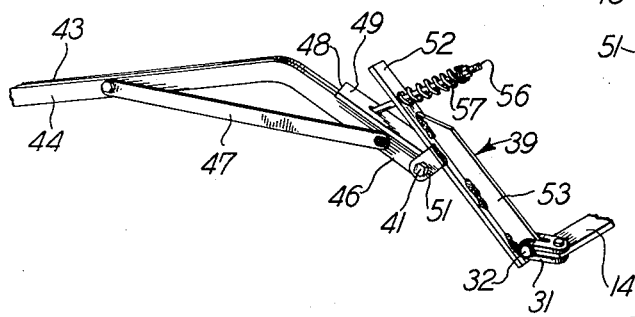
Fig. 2 is an enlarged perspective view of a fragment of Fig. 1 but with parts thereof in a different position.

The hitch 10, therefore, includes the member 34 and the part 37, and the latter is composed of a section or member 38 and another section or member 39, with the two members pivoted or hinged together at the pivot bolt or hinge axis 41. The member 38 is shown to consist of a pair of angle irons 42 placed back to back and bolted together along with a flat bar 43 and an angle iron 44 projecting forwardly from the angle 42. The forward end of the members 43 and 44 includes an oblique or angled portion 46, and a brace 47 is suitably bolted across the bend shown in the members 43 and 44. The portion 46 is shown in Fig. 3 to also include a second angle 48 which forms a rectangular cross-section with the angle 44, and the two angles 44 and 48 are suitably welded or otherwise secured together to present an abutment surface 49 with the top surface of the angle 48 such that the surface 49 is angular or oblique to the portion 38 of the hitch 10. It will be noted that the bolt 41 is disposed at the forward end of the hitch part 37 while the other hitch part or member 39 has an ear or projection 51 depending on each side of the member 39 at a point intermediate the ends of the member 39. The latter is shown to the comprised of a flat plate 52, to which the ears 51 are welded, and a reinforcing rib 53 is also welded to the plate 52. With this arrangement, the underneath surface 54 of the plate 52 presents an abutment surface to the oblique end 46 of the member 38, and thus the two abutment surfaces 49 and 54 are juxtaposed and in contact with each other when the hitch is in the position shown in Fig. 1. With this arrangement, the hitch sections or members 38 and 39 are pivoted together or hinged about the bolt or pin 41. However, the overlapping or abutting arrangement of the members limits the pivoting of the members in one direction when the abutting surfaces 49 and 54 come into contact with each other. Thus, the towing force between the leading and trailing devices will be transmitted through the hitch 10 when the latter is in the position shown in Fig. 1, as the hitch is then essentially a rigid member. However, it should be understood that when the tractor, or other means of towing the implement, stops its forward movement, the inertia of the implements or devices being towed with the hitch 10 causes the trailing implements to create a compression force on the hitch 10 by pushing on the latter at the pin 33 while the front end of the hitch is held against forward movement. Because of the elongated shape and extended length of the hitch 10, the force of intertia tends to bend the part 37 of the hitch 10 and, therefore, means are provided for absorbing the compression forces acting on the hitch when the tractor is slowed or stopped. A bolt 56 is mounted in the section 46 of the hitch to project through the section and through the plate 52 with the openings through which the bolt projects being slightly larger than the diameter of the bolt. A compression coil spring 57 is disposed between a nut 58, on the upper end of the bolt, and the member 52, so that the spring yieldingly urges the members 38 and 39 toward the limited pivotal position which is the Fig. 1 position. Of course, the spring permits the members 38 and 39 to pivot about the bolt 41, as shown in Fig. 2. The upper end of the bolt 56 is threaded for receiving the nut 58 which can, therefore, be moved axially on the bolt for the purpose of altering the tension of the spring 57 and its effective force between the two pivotal members of the hitch.

With the arrangement of the hitch as shown and described, the compressive inertia force caused by the trailing implement will be absorbed by compression of the spring 57 when the two sections 38 and 39 of the hitch pivot as shown in Fig. 2 and this will relieve the hitch of the strain which would otherwise be created by the inertia force. It should be understood that the member 39 will pivot upwardly about the pin 32 when the compressive force is transmitted to the pivot pin 41. When the pin 41 moves upwardly and forwardly from the Fig. 1 to the Fig. 2 position, then the forward end of the member 38 must, of course, make a corresponding move since the forward end of the member is attached to the pin 41, and, in order to permit this, of course, the hitch attachments on the land packer are sufficiently loose to permit the packer frame 24 to tip about its axle 26 and thus permit the portion 38 of the hitch to correspondingly change its angle. In this regard, it is actually preferred that the press hitch 29, and specifically its pin 59, be received in an oversized hole in the packer bracket 28 to allow the frame 24 to tip backward when the inertia of the implements is acting toward the tractor. It will be noted that the arrangement of the hitch 10 is such that the ends attached to the pins 32 and 33 are offset with respect to the hinge or pivot bolt 41 so that a straight line between the pin 32 and the point where the top part of the member 38 connects with the pin 33 is in the present instance downwardly offset in relation to the pin 41. Then the compressive force transmitted between the pins 32 and 33 will cause the hitch 10 to jack-knife or pivot, as shown in Fig. 2, whereas under tension, as when pulling, the hitch will tend to pivot in the direction toward the straight line between the ends of the hitch as far as permitted by the parts 49 and 52.

While a specific embodiment of this invention has been shown and described, it should be obvious that certain changes could be made therein, and the scope of this invention should, therefore, be limited only by the appended claims.

We claim:

1. In a draft gear for coupling a trailing implement to a plow of the type including a plow bottom, a plow beam extending forwardly from said plow bottom, and bending down forwardly of said plow bottom and fastened to a hitch bar, an elongated drawbar extending forwardly from the implement at an elevation corresponding to that of said beam, and having an end portion bending down forwardly of said plow bottom toward said hitch bar, a drawbar section pivotally secured between its ends to said end portion, continuing downwardly and pivotally secured to said hitch bar, said section also extending upwardly over and in contact with the bent down portion of said drawbar, and yieldable means to resiliently maintain said upwardly extending part in contact with said bent down portion, whereby a forward pull on said hitch bar will be transmitted to said implement by contact of said upwardly extending part with said bent down portion, through the resulting substantially rigid structure, while a forward thrust resulting from momentum of said implement will be yieldingly transmitted to said hitch bar through swinging of said drawbar section about said pivotal connections and separation of said upwardly extending part from said bent down portion against the bias of said yieldable means.

2. In a draft gear for coupling a trailing implement to a plow of the type including a plow bottom, a plow beam extending forwardly from said plow bottom and including a lower front end portion attachable to a hitch bar, an elongated drawbar extending forwardly from said implement at an elevation corresponding to that of said beam and including a front end portion disposed downwardly forward of said plow bottom toward said hitch bar, a drawbar section pivotally secured between its ends to the front end portion of said elongated drawbar and providing an extension to said elongated drawbar and pivotally secured to said hitch bar, said section also extending upwardly in overlapping contact with said end portion of said elongated drawbar, and yieldable means for resiliently maintaining said upwardly extending part of the drawbar section in contact with said elongated drawbar end portion for transmitting a forward pull on said hitch bar to said implement by contact of said upwardly extending part with said elongated drawbar end portion, through the resulting substantially rigid structure, and for inducing a hinge action on said structure in response to a forward thrust resulting from momentum of said implement transmitted through said drawbar section to minimize the stresses placed on said elongated drawbar.

References Cited in the file of this patent

UNITED STATES PATENTS

| | | |
|---|---|---|
| 1,581,395 | Danskin | Apr. 20, 1926 |
| 2,070,481 | Gullikson | Feb. 9, 1937 |
| 2,538,301 | Ducksckerer et al. | Jan. 16, 1951 |
| 2,540,677 | Kandt | Feb. 6, 1951 |

FOREIGN PATENTS

| | | |
|---|---|---|
| 302,391 | Great Britain | Dec. 17, 1928 |